US012669318B2

(12) United States Patent
Korenstein

(10) Patent No.: US 12,669,318 B2
(45) Date of Patent: Jun. 30, 2026

(54) SEALED CERAMIC MATERIAL AND METHOD

(71) Applicant: Raytheon Company, Arlington, VA (US)

(72) Inventor: Ralph Korenstein, Natick, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/593,353

(22) Filed: Mar. 1, 2024

(65) Prior Publication Data

US 2025/0277653 A1     Sep. 4, 2025

(51) Int. Cl.
| | |
|---|---|
| *F42B 12/76* | (2006.01) |
| *C04B 41/00* | (2006.01) |
| *C04B 41/45* | (2006.01) |
| *C04B 41/50* | (2006.01) |
| *F41G 7/22* | (2006.01) |

(52) U.S. Cl.
CPC .......... *F42B 12/76* (2013.01); *C04B 41/0072* (2013.01); *C04B 41/4515* (2013.01); *C04B 41/457* (2013.01); *C04B 41/5024* (2013.01); *C04B 41/5049* (2013.01); *F41G 7/2286* (2013.01); *C04B 2235/616* (2013.01)

(58) Field of Classification Search
CPC . F42B 12/76; C04B 41/0072; C04B 41/4515; C04B 41/457; C04B 41/5024; C04B 41/5049; C04B 2235/616; F41G 7/2286
USPC ......................................................... 102/473
See application file for complete search history.

(56) References Cited

U.S. PATENT DOCUMENTS

| | | | |
|---|---|---|---|
| 4,076,991 A | | 2/1978 | Datta |
| 4,505,995 A | | 3/1985 | Bieler et al. |
| 5,436,042 A | * | 7/1995 | Lau ................... C04B 35/62884 |
| | | | 428/221 |
| 5,633,213 A | | 5/1997 | Aghajanian et al. |
| 8,007,557 B2 | | 8/2011 | Merkel |
| 8,261,891 B2 | | 9/2012 | Thebault et al. |
| 8,313,802 B2 | | 11/2012 | Riman et al. |
| 8,940,223 B2 | | 1/2015 | Toncelli |
| 9,266,147 B2 | | 2/2016 | Riman et al. |
| 9,701,591 B2 | | 7/2017 | Sheedy et al. |
| 2025/0084007 A1 | * | 3/2025 | Spaeth ................ C04B 41/0072 |

* cited by examiner

*Primary Examiner* — Samir Abdosh
(74) *Attorney, Agent, or Firm* — Schwegman Lundberg & Woessner, P.A.

(57) ABSTRACT

A ceramic substrate including a porous internal structure including a sealant infiltrator. The sealant infiltrator includes sodium and silicate. The sealant infiltrator infiltrates at least some of the plurality of pores and closes the plurality of pores filled with the sealant infiltrator when exposed to a negative pressure. The sealant infiltrator is distributed across the exterior surface of the ceramic substrate.

20 Claims, 6 Drawing Sheets

100

105

110

110

110

110

110

110

110

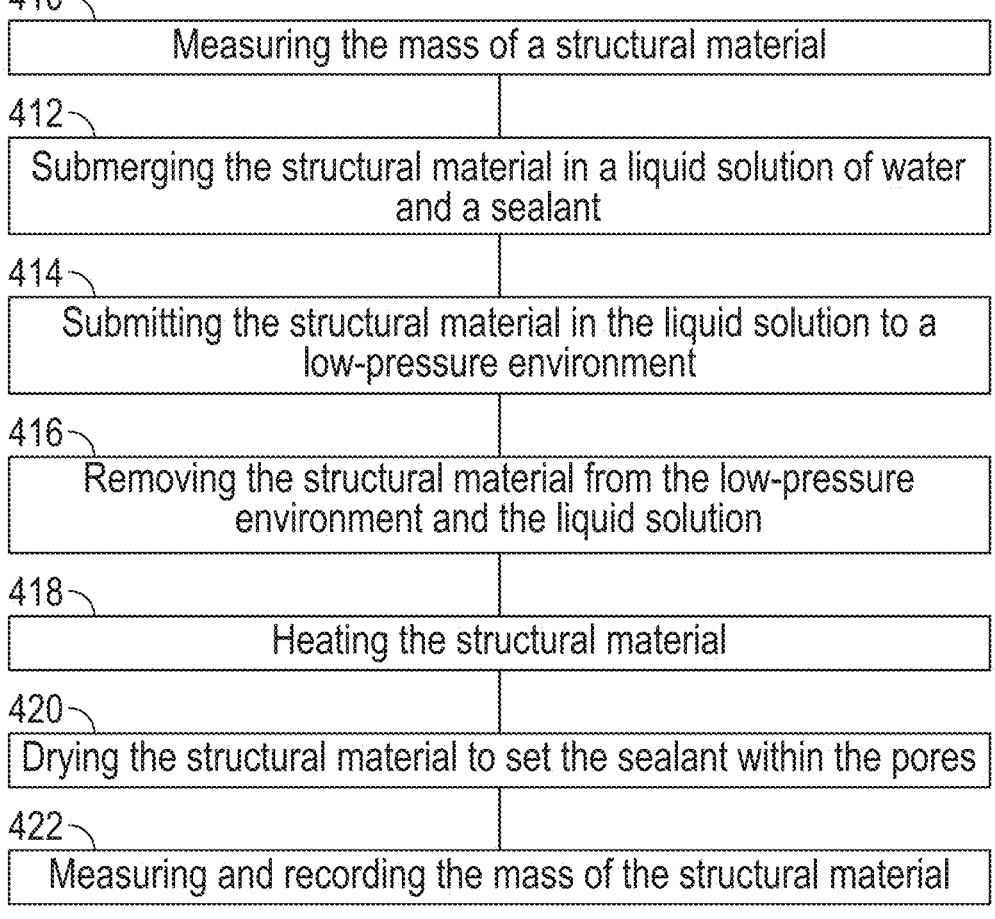

410

Measuring the mass of a structural material

412

Submerging the structural material in a liquid solution of water and a sealant

414

Submitting the structural material in the liquid solution to a low-pressure environment

416

Removing the structural material from the low-pressure environment and the liquid solution

418

Heating the structural material

420

Drying the structural material to set the sealant within the pores

422

Measuring and recording the mass of the structural material

FIG. 4

SEALED CERAMIC MATERIAL AND METHOD

BACKGROUND

Effectors include one or more of rockets, missiles or the like configured to carry payloads. Payloads include, but are not limited to, warheads, satellites, instruments, combinations of these features or the like. The effector includes an energetic device, such as a rocket motor (e.g., solid or liquid propellant), a warhead, or other explosive or insensitive munition.

Effectors are stored at armories, or munition warehouses for future use, and then deployed to the field with military or non-military units, launch vehicles or devices, aircraft, warships or like. Effectors are, for example, stored in outdoor environments where they are exposed to fluctuating weather conditions. In some examples, the effectors are stored for periods of months, years or longer with differing conditions including pressures, temperatures, vibrations or humidities.

SUMMARY

Ceramic materials are used in a multitude of applications because of their material composition, characteristics and compatibility in many different environments. For example, ceramic is a porous material that is structurally sound and exhibits mechanical strength. In some applications, ceramics also present resistance to thermal shocks or fluctuations in temperatures or stresses. Ceramics are resistant to high temperatures. In addition to high temperatures, ceramics are resistant to erosion or degradation caused by environmental conditions.

In some examples, ceramics are used because of their insulative or protective properties. For instance, ceramics are a component of thermal or electrical systems, such as an insulator that encapsulates the systems as protection from environmental conditions. While ceramics, in some forms encapsulates internal components of a system, are also materials that allow radio frequency or other electrical signals to be transmitted from the system to an external receiver, or in reverse to receive signals from an external emitter.

Ceramics, in some examples, are used in systems where communication occurs between a component encased in a ceramic material and an external source. For instance, the component encased in ceramic receives signals from an external source and transmits signals to an external source. In other instances, the ceramic material encases an electrical component where the device remains idle, or unused, for an indeterminate amount of time. In such situations, the ceramic encasing electrical components protects the electrical components from environmental conditions.

In an example, ceramics are a structural material useful in applications where the ceramic is exposed to high temperatures, large forces or changes in forces, or variable environmental conditions. Ceramics, for instance, are useful as a structural material for aerospace applications, propulsion systems, effectors, or the like. In such examples, the material properties of the ceramic are altered for the desired purpose.

In some examples, the density of a ceramic substrate is adjusted to achieve a predetermined desired dielectric constant, such as by increasing the porosity of the ceramic substrate. Increasing porosity includes altering the size of the pores or increasing the quantity of pores, thereby making the ceramic substrate a more porous structure.

Ceramic is beneficial in applications, systems or structures that are exposed to moisture. In some examples, a sealant is applied to counter the absorption of moisture into the porous structure of ceramics. For instance, a sealant is applied to at least the surface of the ceramic.

In an example of the present disclosure, to counter the porosity of a ceramic substrate, the interior porous structure includes at least a sealant infiltrator that fills a majority of a plurality of pores. In such examples, the sealant infiltrator includes sodium and silicate and the sealant penetrates through the interior porous structure. To increase the depth the sealant infiltrator reaches, the ceramic substrate is submitted to a low-pressure environment to promote penetration of the sealant infiltrator.

BRIEF DESCRIPTION OF THE DRAWINGS

FIG. 4 illustrates a method of forming a sealed structural material.

DETAILED DESCRIPTION

Figure 1A:
FIGS. 1A and 1B illustrate cross sections of the ceramic substrate with a plurality of pores according to at least one example of the present disclosure.

Certain ceramics are beneficial for use in outdoor environments where the ceramic is exposed to fluctuating weather conditions. Ceramics include a porous internal structure with a plurality of pores. For example, the ceramic is a structural material that when exposed to moisture, the moisture infiltrates into pores, recesses, cavities or other openings within the ceramic. In some applications, the structural qualities of ceramics are more beneficial than its tendency to absorb moisture.

In some situations, ceramic is formed to have a higher incidence of pores (e.g., recesses, cavities, openings) to reduce the density of a ceramic. In other situations, the size of the pores is increased to reduce the density of the ceramic. Altering or adjusting the size or quantity of pores, in some situations, is intentional to achieve a desired characteristic of the ceramic.

For example, adjusting the size or frequency of pores alters the dielectric constant in the ceramic. The dielectric constant of a material, or the permittivity, is affected by the material through which electricity or electromagnetic radiation passes. In some examples, the dielectric constant of a material is adjusted according to the specified use of the material. Ceramics are one type of material that permits transmission of electricity. In one example, the formed pores are in addition to the naturally occurring plurality of the ceramic. Increasing the occurrence of pores in the ceramic also adjusts the radio frequency transmissibility of the material. Increasing the occurrence of pores subjects the ceramic to moisture from humidity, rain, dew or the like.

Reaction bonded silicon nitride (RBSN) is an example of a ceramic that is altered to achieve a specified density. In certain applications, the density of the RBSN is adjusted so the material is between approximately 65 percent and approximately 80 percent dense of RBSN's theoretical value. In another example, the RBSN is adjusted so the material is between approximate 70 and approximately 75 percent dense of its theoretical value. In yet another example, RBSN is approximately 72 percent dense of its theoretical value.

The density of the RBSN is decreased by, for example, increasing the porosity of the material. The increase in the porosity of the RBSN, in some situations, positively alters the performance of the RBSN. In other examples, moisture infiltrates the additional and/or larger pores, and affects the performance of the RBSN.

Structural materials, such as ceramic materials, have, for example, an initial porous configuration. To counter the effects of moisture infiltration into a ceramic, sealants are sometimes applied to the exterior surface of the ceramic. The sealant minimizes the absorption of moisture by the ceramic. In some examples, the sealant does not penetrate to the interior portions of the ceramic. For example, a surface sealant will not necessarily fill, plug, or occupy pores within the interior structure of the ceramic, such as proximate to a central region.

Exposing the porous material, e.g., ceramic, to a material that passes from the surface, or exterior, of the porous material into the interior structure, in example, fills (either partially or completely) the open pores, such that the porous structure transitions to a sealed configuration. For example, ceramics with an open porosity are filled, or partially filled, with a sealant to counter at least some of the effect of moisture. For example, a sealant is infiltrated, deposited, injected or otherwise received into at least some of the inner pores within the ceramic. Example sealants that are filled into pores include silicon, silica, silicon dioxides, sodium silicates, or the like.

In one example, RBSN is used to form, manufacture projectiles or components of projectiles, such as effectors. Projectiles include such devices as missiles with the ceramic as a structural component of a missile. A component of a projectile that includes a ceramic includes a missile dome or window. In an example, the missile dome or window is formed with or without RBSN. The RBSN is, for example, sealed with a sodium silicate. The sealed RBSN, in some examples, forms a water-resistant structural material.

Figure 1B:
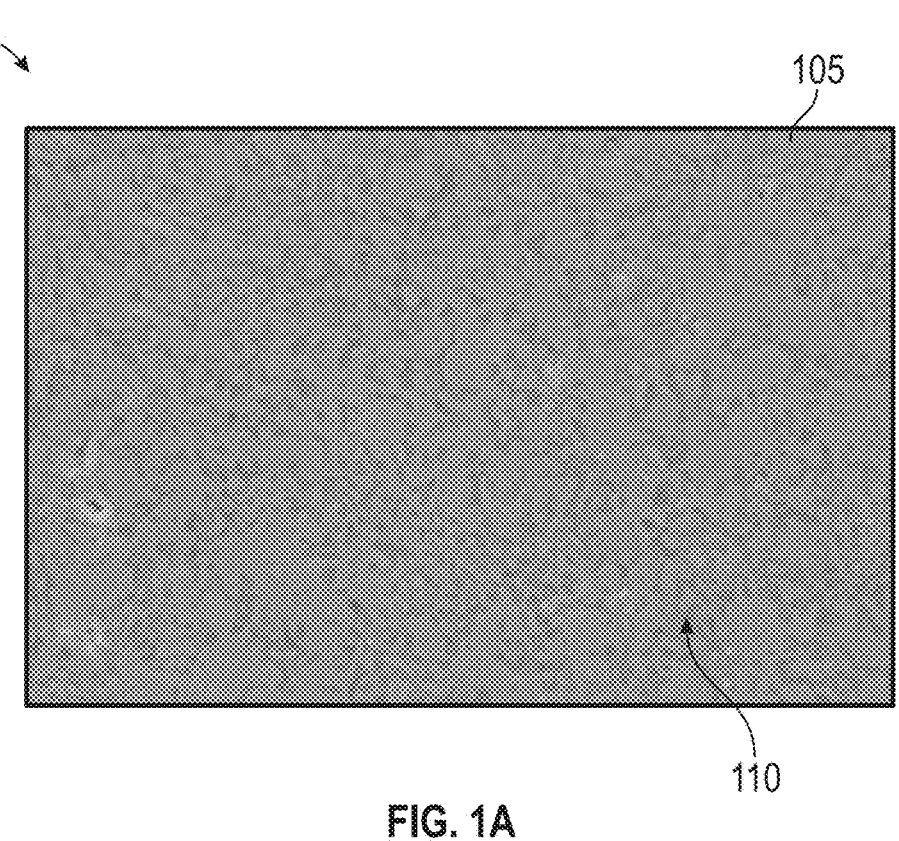

Illustrated in FIGS. 1A and 1B is an example of a structural material 100. The structural material 100 includes, for example, a ceramic. In an example, the ceramic 105 includes a reaction bonded silicon nitride (RBSN). In other examples, the ceramic 105 includes an aluminum oxide, silicon carbide or other silicon nitrides. The structural material 100 illustrated in FIGS. 1A and 1B is a view of a cross section of the ceramic showing the interior porous structure.

There are multiple pores, cavities, recesses or the like dispersed throughout the ceramic 105. In an example, the pores 110 are irregularly spaced throughout the structure. As illustrated in FIGS. 1A and 1B, the pores 110 are irregular in size or shape. In an example, the plurality of pores extends to the exterior surface of the ceramic. The dispersion of pores 110 affects the material characteristics of the ceramic 105, such as density, strength, or electric wave transmissibility.

Figure 2A:
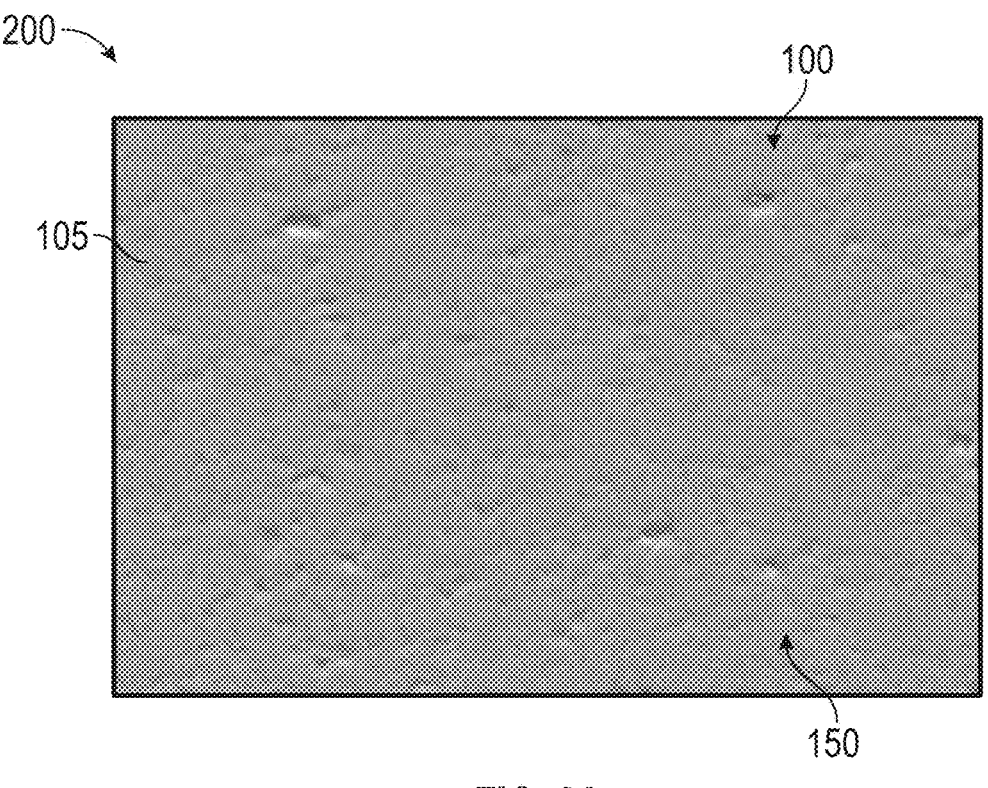
FIGS. 2A and 2B illustrate an example of the ceramic substrate with a plurality of filled pores according to at least one example of the present disclosure.
Figure 2B:
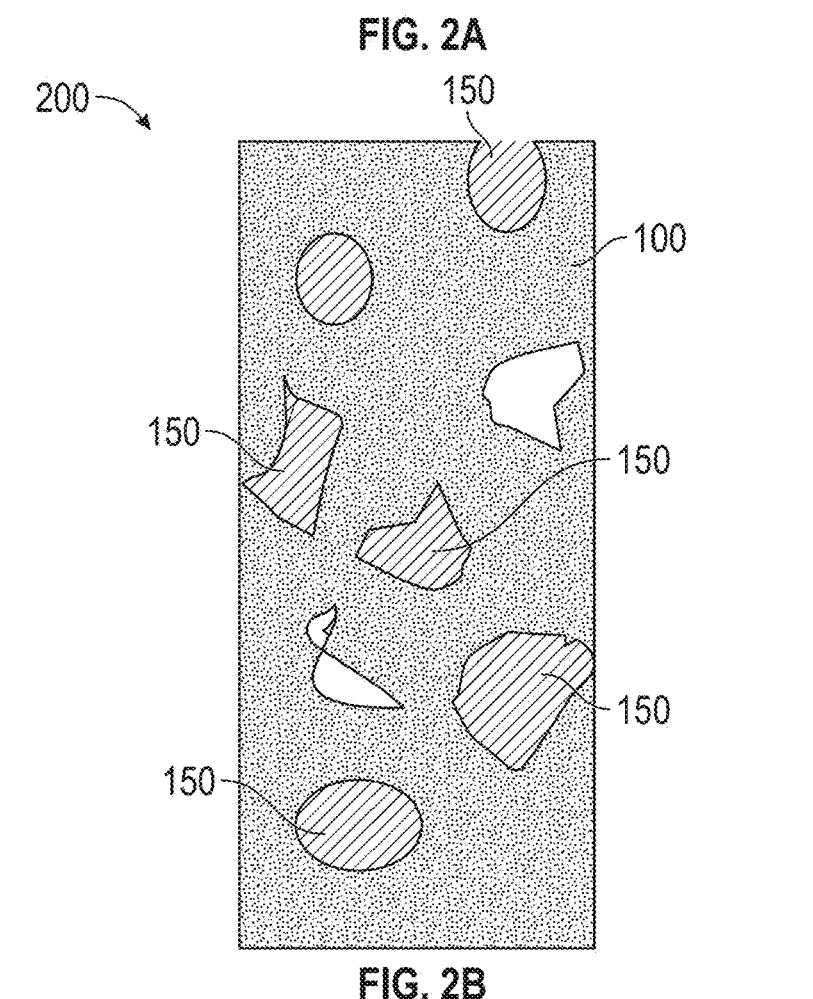

The structural material 100 including the ceramic 105 illustrated in FIGS. 2A and 2B is a view of a similar ceramic 105 of FIGS. 1A and 1B. Illustrated in FIGS. 2A and 2B is an example of the ceramic 105 that has been exposed to a sealant. In the example of FIGS. 2A and 2B, the sealant fills at least some of the pores forming filled pores 150. The sealant in some examples partially fills the pores. In other examples, the sealant fills the majority of the pores.

Illustrated in FIGS. 2A and 2B is an example of the structural material 200 with sealant penetrating the ceramic 105 to infiltrate the pores 150, forming a plurality of filled pores 150 (either partially or completely). The plurality of filled pores 150 are dispersed throughout the structure of the ceramic 105. The filled pores 150 within the ceramic 105 transitions the structural material from a porous material to a moisture-resistant structural material 200.

The ceramic 105 with filled pores 150 (moisture-resistant structural material 200), in some examples, maintains at least some of the qualities of the ceramic 105 before receiving the sealant. For example, the moisture-resistant structural material 200 is resistant to high temperatures, such as temperatures exceeding 100 degrees Celsius. In other examples, the moisture-resistant structural material 200 does not impede transmission of electromagnetic waves, such as radio frequency or electrical signals.

The moisture-resistant structural material 200 is, for example, a ceramic structure that has a density between approximately 65 and approximately 80 percent. In another example, the moisture-resistant structural material has a density between approximately 70 and approximately 75 percent.

Figure 3A:
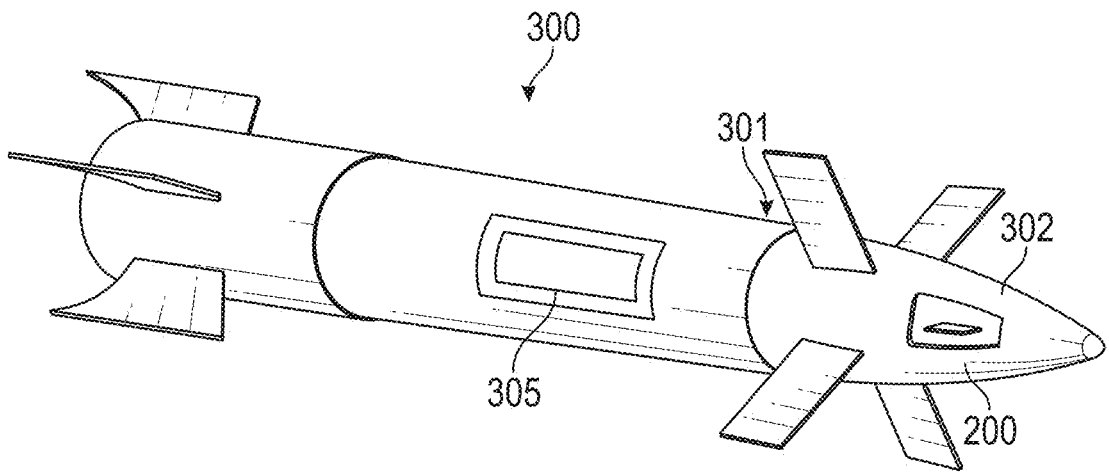
FIGS. 3A and 3B illustrate an example of an effector according to at least one example of the present disclosure.

In certain examples, an effector 300, as illustrated in FIG. 3A, can include or be formed from the moisture-resistant structural material 200, thereby forming a moisture resistant effector. For example, the moisture-resistant structural material 200 is a component of an encapsulating body 302 that is coupled to an end portion 301 of the effector 300. For example, the encapsulating body 302 is a missile dome.

Figure 3B:
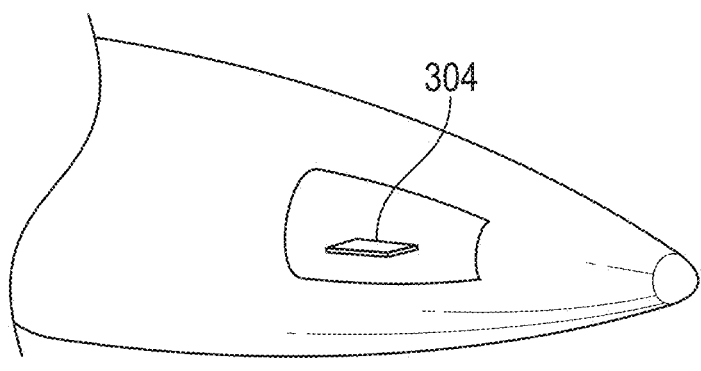

As illustrated in FIG. 3B, the moisture-resistant structural material 200 is optionally a component of an antenna window 304 or other window on a missile dome. The moisture-resistant structural material 200, in another application, is a component of an aerospace structure. In yet another application, the moisture-resistant structural material 200 is a component of an aquatic structure.

In some examples, the effector 300 includes, for instance, electronic components, components of propulsion systems, motors and the like. For example, a rocket motor 305 is installed in the effector body. In other examples, the effector 300 includes guidance systems or control systems. With such internal components, the moisture-resistant material encases or insulates the internal components.

The moisture-resistant structural material 200, in some examples, is formed by infiltrating the ceramic material with a sealant (a "sealant infiltrator"). In such examples, the sealant infiltrator ("sealant") is coupled with a ceramic substrate as the moisture-resistant structural material. A method of sealing the porous structure of material includes at least the several steps of exposing the porous material to a sealant, promoting filling the porous structure with a sealant infiltrator, removing the structural material from exposure to the sealant and repeating the process until the structural material is moisture-resistant.

FIG. 4 illustrates a method of forming the moisture-resistant material. In an example method of forming the moisture-resistant structural material, the ceramic substrate is measured to determine the initial mass, as indicated in 410. In other examples, the initial mass, or the pre-sealed mass, is predetermined. Understanding the pre-sealed mass, whether by active measurement, or determined by other means, is considered as measuring the pre-sealed mass. The initial mass ("pre-sealed mass") in some examples is recorded by a computer system or an individual. In other examples, an individual inputs the initial mass into a computer system. In some examples, the computer system includes a processor that implements instructions stored in the computer system to either measure and/or record the pre-sealed mass.

The method of forming the moisture-resistant material includes a ceramic substrate that, for example, is subjected to or exposed to a liquid, as indicated in 412. The liquid (or liquid solution) is contained in a vessel, container, receptacle or the like, sized to receive at least the ceramic substrate. The liquid includes a sealant interspersed in the liquid. For instance, the liquid contains sodium silicate. In another example, the liquid contains silicon dioxide or a silica. The example liquid in other examples contains sodium metasilicate and water.

Sodium silicate, such as sodium metasilicate, is a water-soluble material. It is also a low-cost material. When sodium silicate transitions from a liquid form it sets within the plurality of pores, for example when dried or set it fills, or partially fills at least some of the plurality of pores. As a set material, sodium silicate is resistant to high temperatures. Sodium silicate is also a water-resistant material. Sodium silicate such as sodium metasilicate is at times used as an adhesive to bond porous materials.

In addition to the sealant infiltrator ("sealant"), zinc oxide or other compounds are included in the liquid solution. Zinc oxide is one example of a compound that promotes the sealant being absorbed within or infiltrating the ceramic substrate. In other examples, different compounds are included in the solution.

After preparation of the solution, the initial ceramic material is, for example, submerged, immersed, or placed into the vessel containing the liquid solution. The ceramic substrate is submerged in a liquid solution (liquid) containing water and, for example, sodium silicate or sodium metasilicate. In one example, the solution contains between approximately 15 percent by weight and approximately 30 percent by weight sodium silicate (or sodium metasilicate) in the solution. In another example, the solution contains between approximately 18 percent and approximately 25 percent by weight sodium silicate. In another example, the solution contains approximately 20 percent by weight sodium silicate.

In another example, the ceramic substrate is submerged in a liquid (liquid solution) prepared with sodium metasilicate, zinc oxide and water. For example, the liquid solution includes approximately 2 percent to approximately 15 percent by weight zinc oxide. In another example, the liquid solution includes approximately 5 percent to approximately 10 percent by weight zinc oxide.

After the ceramic substrate is submerged in the liquid solution the liquid solution containing the ceramic substrate is subjected to a negative pressure environment 414, or a decreased pressure environment as compared to ambient pressure. In another example, the solution containing the ceramic substrate is subjected to a decreased pressure, such as a negative pressure environment. In other examples, the decreased pressure is a pressure less than ambient pressure or a pressure less than the initial pressure of the liquid.

Placing the liquid solution including the ceramic substrate in a negative pressure (or lower pressure than ambient) environment drives the sealant into the plurality of pores of the ceramic substrate. For example, subjecting the ceramic substrate to a negative pressure environment while submerged, air within the pores is forced, or encouraged, out of the pores. When the negative pressure environment is released and the ceramic substrate is returned to an increased pressure, the sealant, such as sodium silicate or sodium metasilicate, infiltrates the ceramic substrate. For example, the sodium silicate, as the sealant infiltrator, is driven into pores throughout the ceramic substrate such as in a central region or any region between a central region and expanding towards the surface. For example, the sealant infiltrator is received in pores proximate to a center region within the ceramic substrate. In other examples, the sealant infiltrator is received in pores between the external surface of the ceramic substrate and the center region. In yet other examples, the sealant infiltrator is received in pores proximate to the external surface of the ceramic substrate.

Zinc oxide, in examples, is included in the solution to assist in promoting the sodium silicate or sodium metasilicate infiltrating into the ceramic substrate. The zinc oxide in some examples promotes sealing pores with sodium metasilicate. Zinc or zinc oxide, in other examples, is used to assist in determining how much sodium silicate has been absorbed in the ceramic substrate.

The amount of time in which the ceramic substrate is submerged in the liquid solution is dependent several variables such as size, shape, profile, or the type of ceramic. The amount of time the ceramic substrate is submerged and subjected to a negative pressure is between a few seconds to several minutes. Longer or shorter lengths of time are also contemplated according to the qualities of the ceramic substrate.

After the ceramic substrate is submerged in the liquid solution and subjected to a decreased pressure, such as a negative pressure or a pressure less than ambient pressure, for a specified period of time, the ceramic substrate is removed from the liquid 416. When the ceramic substrate is removed from the liquid, at least some of the plurality of pores are filled with the sealant, such as sodium silicate or sodium metasilicate, and has a post-sealing configuration. In an example, the sealed ceramic material includes a ceramic material that has a portion of the plurality of pores filled or partially filled. In examples, the sealant is distributed across the exterior surface of the ceramic substrate. As stated previously, sodium silicate sets and becomes water resistant when it transitions from a liquid to a set or dried compound forming a sealed configuration of the ceramic substrate (also referred to as the "sealed ceramic").

To promote the transition of the sodium silicate to a set sealant, the sealed ceramic substrate is, for example, exposed to a high temperature environment 418. In an example, application of heat removes at least some of the moisture content from the sodium silicate, or sodium metasilicate. In addition, applying heat chemically promotes reaction setting of the sodium silicate, or sodium metasilicate. The sealed ceramic is, for example a heat-resistant material such that the material will not be damaged when exposed to high temperatures. For example, the sealed configuration of the ceramic substrate is exposed to temperatures between approximately 100 degrees Celsius and 200 degrees Celsius. In another example, the sealed configuration of the ceramic substrate is exposed to temperatures between approximately 125 degrees Celsius and 175 degrees Celsius. In some examples, the ceramic material in a sealed configuration is exposed to temperatures between approximately 140 degrees Celsius and 160 degrees Celsius. In yet another example, the sealed configuration of the ceramic substrate is exposed to a temperature of approximately 150 degrees Celsius.

The sealed configuration of the ceramic substrate is exposed to a high temperature environment for a period of time determined by how much of the solution has been absorbed and how long it takes for the moisture within the infiltrated liquid to evaporate from the ceramic substrate. For example, a larger quantity of solution absorbed into the ceramic substrate takes a longer period time for the sealed ceramic material to dry, as indicated in 420. For example, the sealed ceramic material is subjected to a high temperature environment for a few seconds to several minutes. However, longer or shorter periods of time are contemplated depending on the conditions of the sealed ceramic material.

In an example, after the sealed ceramic material is dried, the mass of the sealed ceramic material ("post-sealing") is measured and in examples recorded, as indicated in 422. The mass is measured either by an individual or a computer system. If the mass is recorded, the recordation in some examples is performed by an individual or by a computer system. In an example, mass will increase the most during the first iteration of the method.

Figure 5:
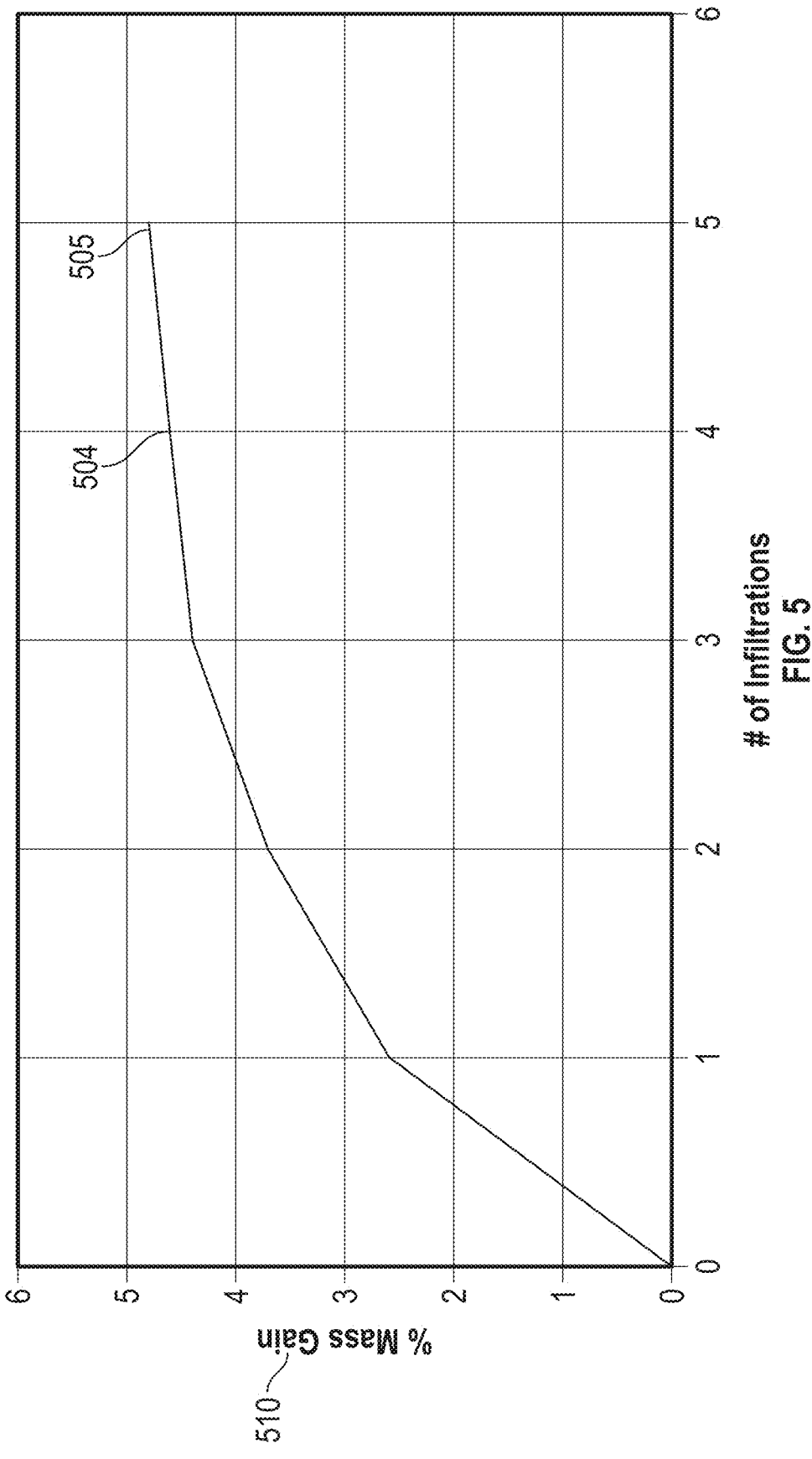
FIG. 5 illustrates an example of recording the mass gain of the structural material.

In an example, the sealed ceramic material is re-submerged in the liquid solution including the sealant. The process is then repeated of submitting the submerged sealed ceramic material to a vacuum or vacuum environment, heating the sealed ceramic material, drying the sealed ceramic material and measuring the mass of the sealed ceramic material. As illustrated in FIG. 5, the method is repeated for multiple iterations. The process ceases when the percentage of mass gain begins to plateau, as illustrated between iteration 504 and iteration 505.

In an example, an indication of the absorption of the sealant is when the mass gain 410 plateaus such that the quantity of sealant being absorbed by the sealed ceramic material decreases. In some examples, plateau is a minimal gain in mass from one iteration to the next. The plateauing effect is, for example, determined by a specified difference in percentage of mass gained between iterations. In some examples the percentage increase is between 1 percent and 2 percent. In another example, the percent increase is between 0.5 percent and 1 percent. In the example illustrated in FIG. 5, the mass gain 510 plateaus when the mass increase, for example between iteration 504 and iteration 505 is less than 0.5 percent. The decrease in the quantity of sealant is an example of an indication the majority of the plurality of pores in the sealed ceramic material have received or been filled with the sealant. When the majority of the pores have been filled or partially filled, the sealed ceramic material is, for example, a water-resistant structural material. In examples, the sealant closes the plurality of pores and extends to exterior surfaces of the ceramic substrate.

In another example, after the sealed ceramic material is dried a cross section of the sealed ceramic material is taken. The cross section of the sealed ceramic material is viewed using a scanning electron microscope. The sealed ceramic is, for example, illustrated with fewer recesses or cavities.

Figure 6A:
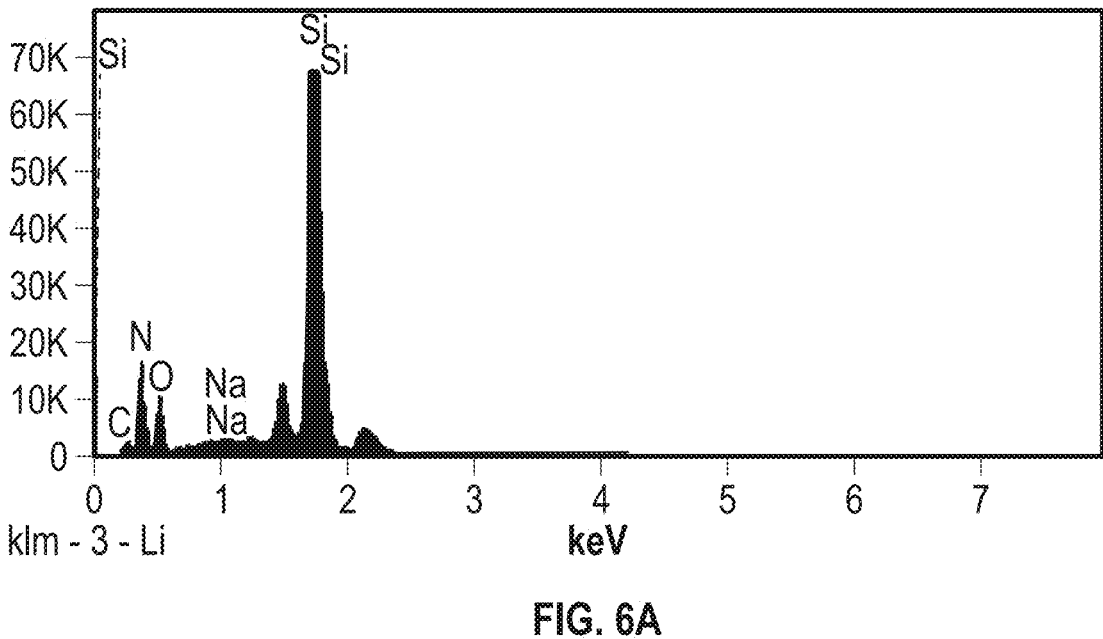
FIGS. 6A and 6B illustrates an example of detecting the atomic composition of the sealed structural material.
Figure 6B:
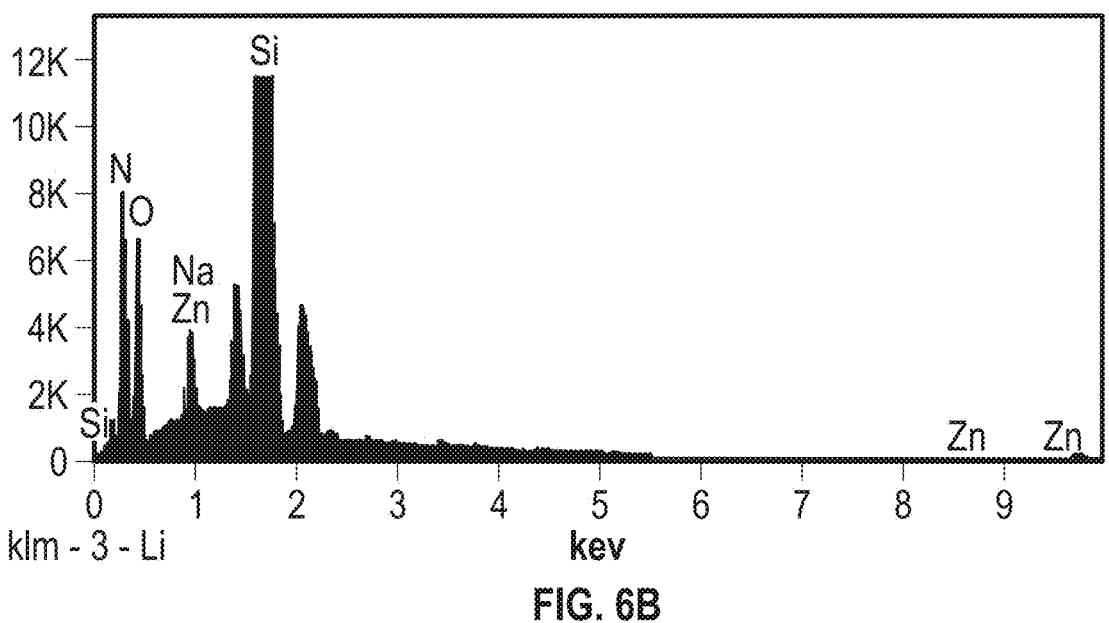

In yet another example, energy-dispersive x-ray analysis (EDAX), as illustrated in FIGS. 6A and 6B, is used to detect the sealant infiltrator within the sealed ceramic material. EDAX is, for example, used to detect elements present in the sealed ceramic material based on the unique atomic structure of each of the elements present in the sealed ceramic material. In examples where EDAX is used, zinc-oxide is included in the liquid solution. The zinc-oxide in certain instances further indicate the sealant absorption levels.

Aspect 1 can include subject matter such as a moisture-resistant effector comprising an effector body; a rocket motor installed in the effector body; where the effector body includes a ceramic substrate, the ceramic substrate includes an exterior surface and a porous internal structure including a plurality of pores, wherein the plurality of pores extend to the exterior surface; and a sealant infiltrator coupled with the ceramic substrate, where the sealant infiltrator includes sodium and silicate, where the sealant infiltrator infiltrates the plurality of pores and closes the plurality of pores, where the sealant infiltrator is distributed across the exterior surface of the ceramic substrate.

Aspect 2 can include, or can optionally be combined with the subject matter of Aspect 1, to optionally include the sealant includes sodium metasilicate.

Aspect 3 can include, or can optionally be combined with the subject matter of one or any combination of Aspects 1 or 2 to optionally include the sealant includes zinc oxide.

Aspect 4 can include, or can optionally be combined with the subject matter of one or any combination of Aspects 1-3 to optionally include the ceramic substrate is configured to permit transmission of radio frequency signals through the ceramic substrate.

Aspect 5 can include, or can optionally be combined with the subject matter of one or any combination of Aspects 1-4 to optionally include the sealant infiltrator is configured to minimize moisture infiltration into the ceramic substrate.

Aspect 6 can include, or can optionally be combined with the subject matter of one or any combination of Aspects 1-5 to optionally include the plurality of pores is configured for at least partial filling with the sealant infiltrator with negative pressure exposure.

Aspect 7 can include, or can optionally be combined with the subject matter of one or any combination of Aspects 1-6 to optionally include the ceramic substrate with the sealant infiltrator is configured to be a structural component of a missile dome or window, and the ceramic substrate with the sealant infiltrator are configured to permit transmission of radio frequency signals through the missile dome or window.

Aspect 8 can include subject matter such as a moisture-resistant effector including a ceramic substrate comprising an effector body; a rocket motor installed in the effector body; an encapsulating body coupled to an end of the effector body, the encapsulating body at least partially containing an electronic component and where at least one of the effector body and the encapsulating body includes the ceramic substrate, the ceramic substrate includes an exterior surface and a porous internal structure including a plurality of pores, wherein the plurality of pores extend to the exterior surface and the ceramic substrate includes a porous configuration and a sealed configuration where in the porous configuration each of the exterior surface and the plurality of pores are open; where in the sealed configuration a sealant infiltrator infiltrates the plurality of pores in the ceramic substrate; where the sealant infiltrator is configured to expand to occupy a least a portion of the plurality of pores, where the sealant infiltrator is distributed across the exterior surface of the ceramic substrate.

Aspect 9 can include, or can optionally be combined with the subject matter of Aspect 8, to optionally include the sealant infiltrator includes sodium silicate.

Aspect 10 can include, or can optionally be combined with the subject matter of Aspect 8 or 9, to optionally include the ceramic substrate is configured to receive the sealant infiltrator as component of a liquid solution; wherein the sealant infiltrator is configured to set when exposed to heat when the ceramic substrate is exposed to temperatures exceeding 100 degrees Celsius.

Aspect 11 can include, or can optionally be combined with the subject matter of Aspect 8-10, to optionally include the ceramic substrate permits transmission of electrical signals through the ceramic substrate.

Aspect 12 can include, or can optionally be combined with the subject matter of Aspect 8-11, to optionally include the sealant infiltrator occupies at least a portion of a majority of pores of the plurality of pores.

Aspect 13 can include, or can optionally be combined with the subject matter of Aspect 8-12, to optionally include the encapsulating body includes a missile dome.

Aspect 14 can include, or can optionally be combined with the subject matter of Aspect 8-13, to optionally include the sealant infiltrator includes zinc oxide and at least one of sodium silicate or sodium metasilicate.

Aspect 15 can include a method of forming a moisture-resistant material included in an effector, the moisture-resistant material including a ceramic substrate having a porous configuration and a sealed configuration, the method including: sealing a ceramic substrate having an exterior surface and a porous internal structure in the porous configuration, the ceramic substrate having a pre-sealing mass, wherein sealing the ceramic substrate includes: submerging the ceramic substrate in a liquid having a sealant infiltrator; decreasing a pressure around the ceramic substrate and sealant infiltrator; releasing the decreased pressure after a specified time, where releasing the decreased pressure drives the sealant infiltrator into a plurality of pores; removing the ceramic substrate with the sealant infiltrator in the plurality of pores from the liquid; heating the ceramic substrate containing the sealant infiltrator to dry the ceramic substrate with the sealant infiltrator in the sealed configuration; and drying the ceramic substrate containing the sealant infiltrator; and determining a post-sealing mass of the ceramic substrate with the sealant infiltrator in the sealed configuration.

Aspect 16 can include, or can optionally be combined with the subject matter of Aspect 15, to optionally include repeating submerging the ceramic substrate in the liquid, applying the decreased pressure, releasing the decreased pressure, removing the ceramic substrate containing the sealant infiltrator, heating and drying the ceramic substrate containing the sealant infiltrator; measuring the mass of the structural material containing additional sealant infiltrator; and recording an increase in mass of the ceramic substrate containing the sealant infiltrator.

Aspect 17 can include, or can optionally be combined with the subject matter of Aspect 15 or 16, to optionally include repeating submerging the ceramic substrate in the liquid, applying the decreased pressure, releasing the decreased pressure, removing the ceramic substrate containing the sealant infiltrator, heating and drying the ceramic substrate containing the sealant infiltrator until the post-sealing mass plateaus.

Aspect 18 can include, or can optionally be combined with the subject matter of Aspect 15-17, to optionally include the sealant infiltrator includes sodium silicate, the method including expanding the sodium silicate in the plurality of pores by heating and drying the ceramic substrate.

Aspect 19 can include, or can optionally be combined with the subject matter of Aspect 15-18, to optionally include the structural material is subjected to the liquid in a negative pressure environment, the method including: promoting infiltration of sodium silicate with a liquid solution including zinc oxide.

Aspect 20 can include, or can optionally be combined with the subject matter of Aspect 15-19, to optionally include the sealant infiltrator is a sodium metasilicate sealant, the method including: forming a missile dome or window including the ceramic substrate with the sealant infiltrator in the sealed configuration.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A moisture-resistant effector comprising:
an effector body;
a rocket motor installed in the effector body;
the effector body includes a ceramic substrate, the ceramic substrate includes:
an exterior surface; and
a porous internal structure including a plurality of pores, wherein the plurality of pores extend to the exterior surface; and
a sealant infiltrator coupled with the ceramic substrate:
wherein the sealant infiltrator includes sodium and silicate;
wherein the sealant infiltrator infiltrates the plurality of pores and closes the plurality of pores;
wherein the sealant infiltrator is distributed across the exterior surface of the ceramic substrate.

2. The moisture-resistant effector of claim 1, wherein the sealant includes sodium metasilicate.

3. The moisture-resistant effector of claim 1, wherein the sealant includes zinc oxide.

4. The moisture-resistant effector of claim 1, wherein the ceramic substrate is configured to permit transmission of radio frequency signals through the ceramic substrate.

5. The moisture-resistant effector of claim 1 wherein the sealant infiltrator is configured to minimize moisture infiltration into the ceramic substrate.

6. The moisture-resistant effector of claim 1, wherein the plurality of pores is configured for at least partial filling with the sealant infiltrator with negative pressure exposure.

7. The moisture-resistant effector of claim 1, wherein the ceramic substrate with the sealant infiltrator is configured to be a structural component of a missile dome or window, and the ceramic substrate with the sealant infiltrator are configured to permit transmission of radio frequency signals through the missile dome or window.

8. A moisture-resistant effector including a ceramic substrate comprising:
an effector body;
a rocket motor installed in the effector body;
an encapsulating body coupled to an end of the effector body, the encapsulating body at least partially containing an electronic component; and
wherein at least one of the effector body and the encapsulating body includes the ceramic substrate, the ceramic substrate includes:
an exterior surface; and
a porous internal structure including a plurality of pores,
wherein the plurality of pores extend to the exterior surface; and
the ceramic substrate includes a porous configuration and a sealed configuration:
wherein in the porous configuration each of the exterior surface and the plurality of pores are open;
in the sealed configuration a sealant infiltrator infiltrates the plurality of pores in the ceramic substrate;
wherein the sealant infiltrator is configured to expand to occupy a least a portion of the plurality of pores;
wherein the sealant infiltrator is distributed across the exterior surface of the ceramic substrate.

9. The moisture-resistant effector of claim 8, wherein the sealant infiltrator includes sodium silicate.

10. The moisture-resistant effector of claim 8, wherein the ceramic substrate is configured to receive the sealant infiltrator as component of a liquid solution;
wherein the sealant infiltrator is configured to set when exposed to heat when the ceramic substrate is exposed to temperatures exceeding 100 degrees Celsius.

11. The moisture-resistant effector of claim 9, wherein the ceramic substrate permits transmission of electrical signals through the ceramic substrate.

12. The moisture-resistant effector of claim 8, wherein the sealant infiltrator occupies at least a portion of a majority of pores of the plurality of pores.

13. The moisture-resistant effector of claim 8, wherein the encapsulating body includes a missile dome.

14. The moisture-resistant effector of claim 8, wherein the sealant infiltrator includes zinc oxide and at least one of sodium silicate or sodium metasilicate.

15. A method of forming a moisture-resistant material included in an effector, the moisture-resistant material including a ceramic substrate having a porous configuration and a sealed configuration, the method including:
sealing a ceramic substrate having an exterior surface and a porous internal structure in the porous configuration, the ceramic substrate having a pre-sealing mass, wherein sealing the ceramic substrate includes:
submerging the ceramic substrate in a liquid having a sealant infiltrator;
decreasing a pressure around the ceramic substrate and sealant infiltrator;
releasing the decreased pressure after a specified time;
wherein releasing the decreased pressure drives the sealant infiltrator into a plurality of pores;
removing the ceramic substrate with the sealant infiltrator in the plurality of pores from the liquid;
heating the ceramic substrate containing the sealant infiltrator to dry the ceramic substrate with the sealant infiltrator in the sealed configuration; and
drying the ceramic substrate containing the sealant infiltrator; and
determining a post-sealing mass of the ceramic substrate with the sealant infiltrator in the sealed configuration.

16. The method of forming the moisture-resistant effector of claim 15, including repeating submerging the ceramic substrate in the liquid, applying the decreased pressure, releasing the decreased pressure, removing the ceramic substrate containing the sealant infiltrator, heating and drying the ceramic substrate containing the sealant infiltrator;
measuring the mass of the structural material containing additional sealant infiltrator; and
recording an increase in mass of the ceramic substrate containing the sealant infiltrator.

17. The method of forming the moisture-resistant effector of claim 16, including:
repeating submerging the ceramic substrate in the liquid, applying the decreased pressure, releasing the decreased pressure, removing the ceramic substrate containing the sealant infiltrator, heating and drying the ceramic substrate containing the sealant infiltrator until the post-sealing mass plateaus.

18. The method of forming the moisture-resistant effector of claim 15, wherein the sealant infiltrator includes sodium silicate, the method including:
expanding the sodium silicate in the plurality of pores by heating and drying the ceramic substrate.

19. The method of forming the moisture-resistant effector of claim 15, wherein the structural material is subjected to the liquid in a negative pressure environment, the method including: promoting infiltration of sodium silicate with a liquid solution including zinc oxide.

20. The method of forming the moisture-resistant effector of claim 15, wherein the sealant infiltrator is a sodium metasilicate sealant, the method including:

forming a missile dome or window including the ceramic substrate with the sealant infiltrator in the sealed configuration.

* * * * *